United States Patent
Bierl et al.

(10) Patent No.: US 8,126,154 B2
(45) Date of Patent: Feb. 28, 2012

(54) CIRCUIT ARRANGEMENT FOR THE BIDIRECTIONAL OPERATION OF SOUND TRANSDUCERS DISPOSED AT THE ENDS OF A MEASURING SECTION

(75) Inventors: Rudolf Bierl, Regensburg (DE); Waldemar Fruehauf, Nürnberg (DE); Martin Lesser, Landshut (DE); Andreas Meyer, Zell (DE); Frank Steuber, Korntal-Münchingen (DE)

(73) Assignee: Continental Automotive GmbH, Hannover (DE)

( * ) Notice: Subject to any disclaimer, the term of this patent is extended or adjusted under 35 U.S.C. 154(b) by 457 days.

(21) Appl. No.: 12/310,713

(22) PCT Filed: Sep. 5, 2007

(86) PCT No.: PCT/EP2007/059287
§ 371 (c)(1),
(2), (4) Date: Mar. 4, 2009

(87) PCT Pub. No.: WO2008/028927
PCT Pub. Date: Mar. 13, 2008

(65) Prior Publication Data
US 2009/0290731 A1    Nov. 26, 2009

(30) Foreign Application Priority Data

Sep. 5, 2006  (DE) .......................... 10 2006 041 531

(51) Int. Cl.
*H03G 11/00*  (2006.01)
*H01L 21/66*  (2006.01)

(52) U.S. Cl. .......................................... 381/55; 438/18

(58) Field of Classification Search .................... 381/55, 381/71.7, 150; 438/11, 18; 73/861.28; 257/E21.521–E21.531
See application file for complete search history.

(56) References Cited

U.S. PATENT DOCUMENTS

| | | | | |
|---|---|---|---|---|
| 4,424,715 | A * | 1/1984 | Hansen | ...................... 73/861.28 |
| 6,003,385 | A | 12/1999 | De Vanssay et al. | |
| 6,074,346 | A | 6/2000 | Oppelt et al. | |
| 6,083,164 | A | 7/2000 | Oppelt et al. | |
| 6,584,861 | B1 | 7/2003 | Jespersen | |
| 2005/0061085 | A1 | 3/2005 | Jespersen | |

FOREIGN PATENT DOCUMENTS

| | | |
|---|---|---|
| DE | 24 53 765 | 8/1975 |
| DE | 30 25 788 | 1/1982 |
| DE | 3025788 | 1/1982 |
| DE | 44 00 448 | 7/1995 |
| DE | 44 00 488 | 7/1995 |
| DE | 198 10 798 | 9/1998 |
| DE | 100 48 959 | 5/2001 |
| DE | 102 36 563 | 3/2004 |
| EP | 0 477 419 | 4/1992 |
| EP | 0 498 141 | 8/1992 |
| EP | 0 807 824 | 11/1997 |
| EP | 0 846 936 | 6/1998 |
| GB | 1 482 561 | 8/1977 |
| WO | WO 95/18956 | 7/1995 |
| WO | WO 03/036240 | 5/2003 |

* cited by examiner

*Primary Examiner* — Calvin Lee
(74) *Attorney, Agent, or Firm* — Cozen O'Connor

(57) ABSTRACT

A sensor circuit for a flow sensor comprises terminating impedances connected in parallel to the sound transducers and has a signal generator, which is configured as a power source. The circuit arrangement is suitable particularly for the operation of an airflow sensor in internal combustion engines.

6 Claims, 2 Drawing Sheets

CIRCUIT ARRANGEMENT FOR THE BIDIRECTIONAL OPERATION OF SOUND TRANSDUCERS DISPOSED AT THE ENDS OF A MEASURING SECTION

PRIORITY CLAIM

This is a U.S. national stage of application No. PCT/EP2007/059287, filed on 5 Sep. 2007, which claims Priority to the German Application No.: 10 2006 041 531.0, filed: 5 Sep. 2006 the content of both being incorporated here by reference.

BACKGROUND OF THE INVENTION

1. Field of the Invention

The invention relates to a circuit arrangement for bidirectional operation of sound transducers disposed at ends of a measuring section, having a signal generator and a receiver which are connected to the sound transducers by means of switching elements.

2. Description of the Prior Art

A circuit arrangement for sound tranducers is disclosed in De 198 10 798 A1. The known circuit arrangement comprises a signal generator which has a transmission output stage connected downstream of it. The transmission signal generated by the signal generator is optionally passed to one of the two ultrasonic transducers with the aid of a multiplexer. The multiplexer can connect the ultrasonic transducers to a preamplifier, which is used as a receiver and has an evaluation circuit connected downstream of it. The multiplexers are optionally used to connect one of the two ultrasonic transducers to the signal generator, whereas the respective other ultrasonic transducer is connected to the preamplifier and to the evaluation unit. Accordingly, ultrasonic signals can be transmitted in both directions along the measuring section defined by the ultrasonic transducer. The measuring section crosses a gas mass flow such that different propagation times for the sound signal result for the two transmitting directions. The velocity of the gas flow can then be inferred from the different propagation times.

Flowmeters for liquid or gaseous media can be set up with the aid of the known circuit arrangement. This includes metering of fuels, filling of drinks and calculations of the consumption of water or gas.

The flow measurement apparatuses set up with the circuit arrangement have a number of advantages. One advantage is that the apparatuses are suitable for all liquids and gases. Furthermore, the medium itself is not distorted by the measurement. Since the apparatuses manage without mechanical parts which are subject to wear, the apparatuses have a high long-term stability. Furthermore, high temporal resolutions are possible since the propagation times of the ultrasonic signals are generally less than one millisecond. Another advantage is that the direction of the flowing medium can be detected and that the apparatus has a linear measurement characteristic. Finally, additional information relating to substance properties or substance compositions can also be measured with the aid of the measuring apparatuses by determining, for example, the sound velocity of the ultrasonic signals in the medium. The low space requirement and the comparatively small mass of the measuring apparatus as well as the low power requirement, which enables use together with current-saving microcontrollers, should finally be emphasized.

So that no measurement errors occur in the known circuit arrangement, reciprocity must be ensured in the transmitting and receiving paths. For this purpose, use is respectively made of a signal generator and a receiver which is connected to the respective ultrasonic transducers. Furthermore, identical terminating impedances are connected in series with the ultrasonic transducers, said impedances ensuring that the differences in the electrical properties of the sound transducers, which differences arise even when the ultrasonic transducers are selected in pairs, do not result in zero point deviations during measurements on the stationary medium or in characteristic curve distortions.

For optimal power matching, the impedance of the terminating impedances must be selected to be equal to the impedance of the ultrasonic transducers at the resonant frequency of the ultrasonic transducers. Half of the signal emitted by the signal generator is thus lost at the terminating impedances. In the known circuit arrangement, the signal generator must therefore provide high signal voltages so that an ultrasonic signal with a sufficient signal strength arrives at the receiving ultrasonic transducer. The high signal voltages to be supplied by the signal generator may result in interference between the transmitting path and the receiving path, which interference distorts the measurement of the flow velocity. In addition, further devices in the vicinity may be subject to interference.

SUMMARY OF THE INVENTION

On the basis of this prior art, the invention is therefore based on an object of providing an improved circuit arrangement for the bidirectional operation of sound transducers disposed at the ends of a measuring section.

This object is achieved by a circuit arrangement having terminating impedances less then an impendance of a signal generator.

In the circuit arrangement, the terminating impedances are connected in parallel with the sound transducers. Furthermore, the signal generator is a signal current source having an internal impedance above the magnitude of the terminating impedances. In this circuit arrangement, the full voltage of the transmission signal generated by the signal generator is applied to the sound transducers. The sound transducers thus see the full signal emitted by the signal generator, and the risk of interference is reduced. Another advantage is that the terminating impedances do not have to be connected or disconnected depending on the transmitting or receiving path but rather are permanently connected to the ultrasonic transducer. Finally, there is also reciprocity since, on account of the high internal impedance of the current source, the impedance seen by the sound transducer is essentially equal to the impedance of the terminating impedance, with the result that a sound transducer, which is used as a transmitter, sees the same impedance as a sound transducer which is used as a receiver.

In one preferred embodiment, the current source is formed by a current mirror that is a current source with a high internal impedance.

In another preferred embodiment, the current mirror is driven by a control current source, one pole of which is at ground potential. Such a control current source can be driven in a simple manner using logic signals.

To increase the output impedance of the signal current source, the current mirror is connected in series with a cascade circuit. In addition, the cascode circuit means that the transistors of the current mirror are selected based on switching speed and do not have to be selected based on dielectric strength.

The receiver is connected to the sound transducers of switching elements. The switching elements are preferably formed by transistors, the control input of which is supplied by a further control current source. This minimizes the phase rotation of the input signal due to parasitic capacitances between the control input and the switching connections of the transistor.

BRIEF DESCRIPTION OF THE DRAWINGS

Further advantages and details of the invention emerge from the following description in which exemplary embodiments of the invention are explained in detail using the accompanying drawing, in which.

DETAILED DESCRIPTION OF THE PRESENTLY PREFERRED EMBODIMENTS

Figure 1:
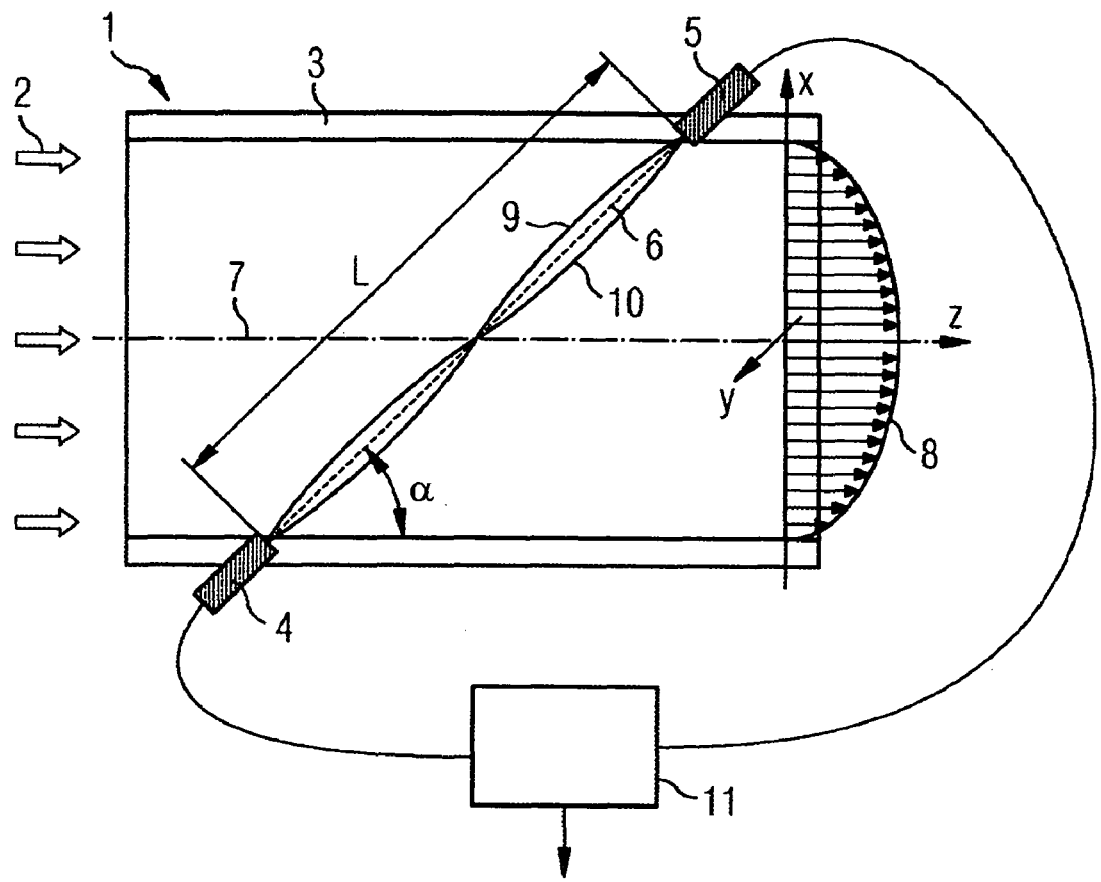
FIG. 1 depicts a measuring apparatus for determining the mean flow velocity in a flow channel.

FIG. 1 shows a flow sensor 1 to determine a mean velocity of a fluid flow 2 through a flow channel 3. For this purpose, ultrasonic transducers 4 and 5 which define a measuring section 6 of the length L are arranged in the wall of the flow channel 3. In this case, the measuring section 6 is inclined by an angle α with respect to a longitudinal axis 7 of the flow channel 3.

In the illustration of FIG. 1, the longitudinal axis 7 of the flow channel 3 is selected to be the same as the z axis of a coordinate system. In the case of a laminar flow, the fluid flow 2 has a paraboloid-shaped flow profile 8. Due to the paraboloid flow profile 8, a sound path 9 which runs downstream differs from a sound path 10 which runs upstream. In the text below, $t_{down}$ is used to denote the propagation time of a sound signal running downstream along the sound path 9 and $t_{up}$ is used to denote the propagation time of a sound signal running upstream along the sound path 10. The velocity averaged $v_m$ over the cross section of the flow channel 3 then results as:

$$v_m = L/(2 \cos \alpha)(1/t_{down} - 1/t_{up}) \qquad (1)$$

and the sound velocity results as $$c_0^2 = v_m^2 + L^2/(t_{up} \cdot t_{down}) \qquad (2)$$

It is accordingly possible to determine the flow velocity averaged along the measuring section 6 and the sound velocity by measuring the two propagation times $t_{down}$ and $t_{up}$. The volume of the quantity of fluid flowing through can then be determined together with the geometrical dimensions of the cross section of the flow channel 3.

For this purpose, a sensor circuit 11 causes the ultrasonic transducer 4, for example, to emit a sound signal to the ultrasonic transducer 5. The sensor circuit 11 determines the propagation time $t_{down}$ of the sound signal. The sensor circuit 11 then causes the ultrasonic transducer 5 to transmit a sound signal to the ultrasonic transducer and the sensor circuit 11 determines the propagation time $t_{up}$.

Figure 2:
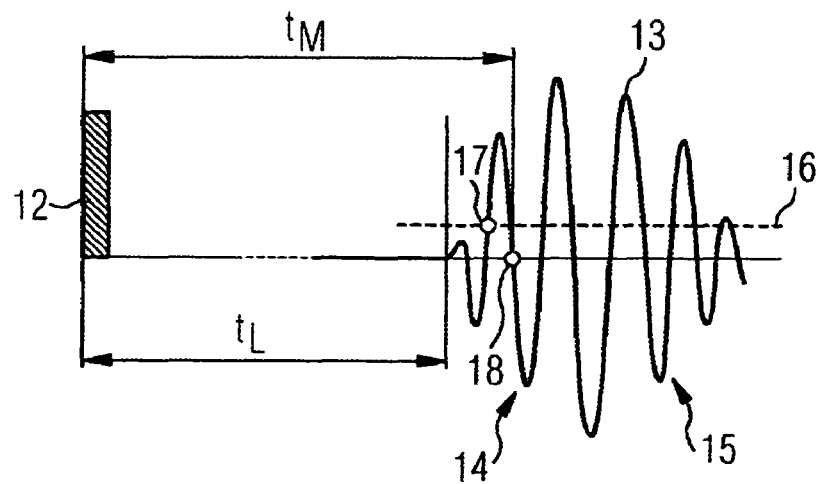
FIG. 2 is a graph of a temporal course of a measurement.

Sound signals are emitted, according to FIG. 2, by a transmission pulse 12 being applied to the ultrasonic transducer 4 or 5. The square-wave transmission pulse 12 results in transient oscillation and subsequent settling of the ultrasonic transducer 4 or 5. A received signal 13 received by the opposite ultrasonic transducer 4 or 5 accordingly also exhibits slow transient oscillation 14 with subsequent settling 15. The rise in the received signal 13 during transient oscillation 14 is detected with the aid of a threshold value 16. Oscillation of the received signal 13 is detected by virtue of the threshold value 16 being exceeded 17. A subsequent zero crossing 18 of the selected oscillation defines the temporal position $t_M$ of the received signal 13. The absolute propagation time $t_L$ sought, which, depending on the measurement operation, is equal to the propagation time $t_{down}$ or $t_{up}$, must be calculated from the measurement time $t_M$ by subtracting an integer multiple of half the oscillation duration. In the present case, three half oscillation periods must be subtracted from the measurement time $t_M$ in order to reach the propagation time $t_L$.

The measurement accuracy of the flow sensor 1 is decisively determined by its zero point stability. This means that, when the medium is stationary, only negligible differences may result in both measuring directions when determining the propagation time $t_L$.

Figure 3:
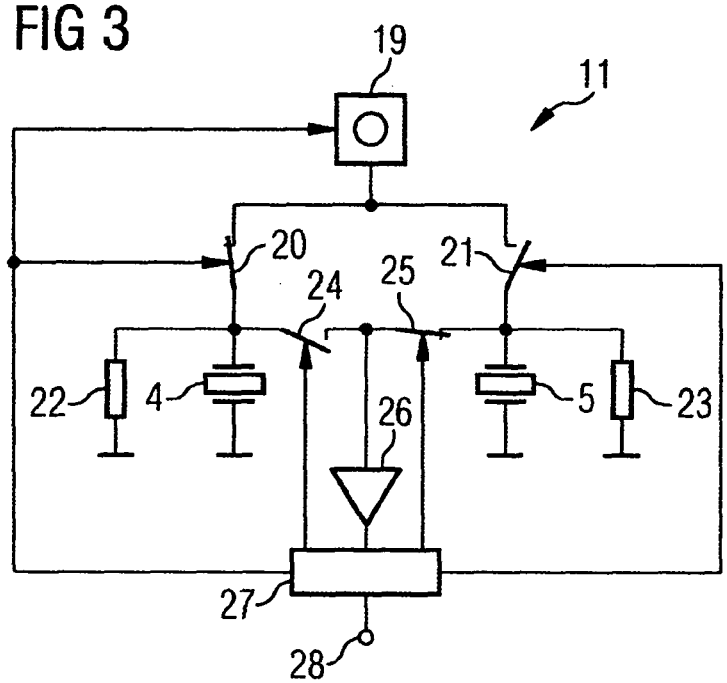
FIG. 3 is a schematic block diagram of a circuit arrangement for operating the measuring apparatus from FIG. 1.

FIG. 3 illustrates a block diagram of the sensor circuit 11. The sensor circuit 11 comprises a signal generator 19 which generates an output signal which can be used to excite the ultrasonic transducer 4 or 5. The output signal from the signal generator 19 is supplied to the ultrasonic transducer 4 or 5 via switching elements 20 and 21. Terminating impedances 22 and 23 are connected in parallel with the ultrasonic transducers 4 and 5. The received signals generated by the ultrasonic transducers 4 and 5 can be supplied, via further switching elements 24 and 25, to a reception amplifier 26 whose output is applied to an evaluation circuit 27 which determines the propagation time $t_L$ according to FIG. 2 and outputs it at an output 28.

The evaluation circuit 27 also controls the emission of the transmission signal by the signal generator 19. Furthermore, the evaluation circuit 27 also controls the switching elements 20 and 21 as well as 24 and 25.

Together with the terminating impedances 22 and 23 and the respectively connected output impedance of the signal generator 19 or the input impedance of the reception amplifier 26, the ultrasonic transducers 4 and 5 form two phase shifters which are linearly coupled to one another via the sound signals which are interchanged. So that the entire phase shift remains the same irrespective of the transmitting direction, the output impedances of the signal generator 19 and the input impedance of the reception amplifier 26 should preferably be as high as possible and the terminating impedances 22 and 23 should be the same as far as possible. This is because, even when selected in pairs, the ultrasonic transducers 4 and 5 have different properties. If, however, in their function as transmitter or receiver, the ultrasonic transducers 4 and 5 see different impedances, the phase rotation is different depending on the measuring direction. If, however, in their function as transmitter or receiver, the ultrasonic transducers 4 and 5 each see the same impedance, the same phase shift respectively results irrespective of the transmitting direction. The same phase shift in both directions is very important since the flow velocity results from a difference between the measured propagation times $t_{down}$ and $t_{up}$. For this reason, absolute accuracy of 1 ppm is advantageous with regard to the determination of the propagation times. However, this accuracy presupposes reciprocity which is as high as possible during measurement.

Figure 4:
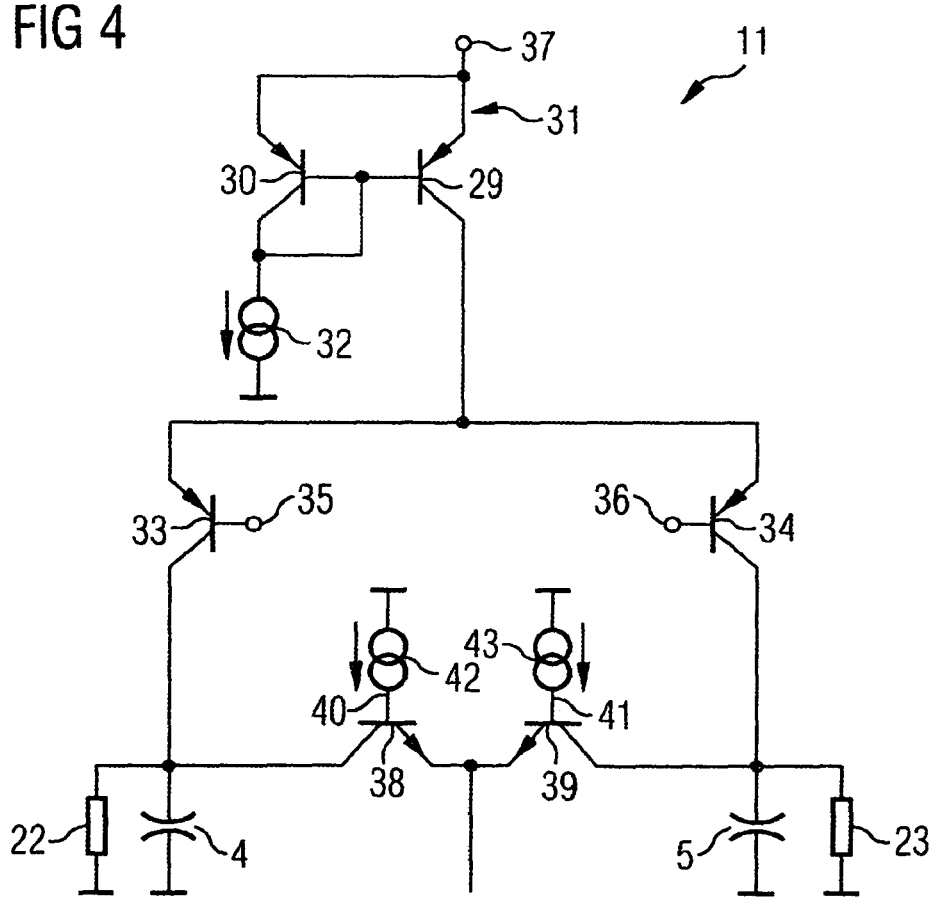
FIG. 4 is a schematic of a circuit for operating the measuring apparatus from FIG. 1.

FIG. 4 illustrates part of the sensor circuit 11 in detail again. The sensor circuit 11 illustrated in detail in FIG. 4 comprises a current mirror 31 which is formed by a pulse transistor 29 and a control transistor 30 and is driven by a control current source 32. Together with the current source 32, the current mirror 31 corresponds to the signal generator 19 in FIG. 3. Since the internal impedance of the current mirror 31 is comparatively high, the ultrasonic transducers 4 and 5 see only the terminating impedances 22 and 23 during transmission.

The internal impedance seen by the ultrasonic transducer 4 and 5 can be increased again by means of cascode transistors 33 and 34. At the same time, the cascode transistors 33 and 34 may assume the function of the switching elements 20 and 21. In this case, when the cascode transistors 33 and 34 are active, the cascode voltage applied to the control inputs 35 and 36 is only a few volts below the supply voltage applied to a supply input 37. Since the emitter of the cascode transistors 33 and 34 is above the cascode voltage applied to the base of the cascode transistors only by the small base-emitter voltage, it follows from this that only a few volts are dropped across the emitter-collector path of the pulse transistor 29 of the current mirror 31, with the result that, even with a supply voltage of the order of magnitude of several 100 V, the pulse transistor 29 need not be selected from the point of view of the dielectric strength but rather can be selected from the point of view of the switching speed.

One advantage of the sensor circuit 11 illustrated in FIG. 4 is that one connection of the control current source 32 is at ground potential, with the result that the control current source 32 can be driven by the evaluation circuit 27 in a simple manner using corresponding logic signals.

Another advantage is that the pulse voltage of the transmission pulse 12, which voltage is applied to the ultrasonic transducer 4 and 5, may be almost as high as the supply voltage applied to the supply input 37. Therefore, in the circuit 11 illustrated in FIG. 4, twice the voltage applied to the ultrasonic transducer 4 and 5 need not be provided as the supply voltage. Rather, the possible pulse voltage is essentially smaller than the supply voltage only by the maximum saturation voltage of the pulse transistor 29 in the current mirror 31. If necessary, the saturation voltage of the cascode transistors 34 or 35 may also be subtracted therefrom. Only a few percent of the supply voltage is thus generally lost.

In order to control the receiving path, the sensor circuit 11 illustrated in FIG. 4 has switching transistors 38 and 39 whose control inputs 40 and 41 are supplied by current sources 42 and 43. On account of their high internal impedance, the current sources 42 and 43 ensure that parasitic capacitances in the switching transistors 38 and 39, which, together with the internal impedances of the current sources 42 and 43, form RC elements, do not give rise to any significant phase shift in the received signal 13.

It is noted that, in order to maximize the measuring frequency, provision may be made of short-circuiting means which each short-circuit the transmitting ultrasonic transducer 4 and 5 following transmission for a particular amount of time in order to discharge the ultrasonic transducers 4 and 5 in a more rapid manner.

The flow sensor 1 described here is suitable, in particular, as an air mass flow sensor in order to determine the amount of air taken in by an internal combustion engine in the intake line. More than 1000 measurements per second can be carried out using the flow sensor 1. In this respect, it is possible to determine the amount of fuel to be injected on a cylinder-selective basis.

Furthermore, the flow sensor 1 makes it possible to use high voltages, with the result that the received signals 13 are also correctly detected in an environment which is exposed to sound. Therefore, the measurement cannot be interfered with by extraneous sound either. The insensitivity to interference caused by extraneous sound is particularly important when the air flow comes from a turbocharger.

Since, as in the prior art, twice the voltage applied to the ultrasonic transducer 4 and 5 does not need to be fed into the sensor circuit 11 either, the risk of interference from other devices in the engine compartment is finally considerably lower. This is also aided by the fact that the voltage pulse which possibly causes interference is produced only at the transducer and not only with half the amplitude but also with a predominantly attenuated sinusoidal oscillation, the frequency spectrum of which gives rise to considerably less interference than the frequency spectrum of a hard square-wave pulse. However, a hard square-wave pulse is the signal waveform which must be generated by a conventional pulse generator which is connected to the sound transducer via series-connected matching impedances.

Furthermore, it is pointed out that features and properties which have been described in connection with a particular exemplary embodiment can also be combined with another exemplary embodiment except when this is precluded for reasons of compatibility.

It is also pointed out that, in the claims and the description, the singular form includes the plural form except when something else results from the context. In particular, if the indefinite article is used, both the singular and plural forms are intended.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A circuit arrangement for the bidirectional operation of sound transducers disposed at the ends of a measuring section comprising:
   a signal generator configured as a signal current source;
   a receiver;
   pair of sound transducers;
   a plurality of switch elements configured to couple one of the pair of sound transducers to the receiver and the other of the pair of sound transducers to the signal generator;
   a terminating impedance connected in parallel with each of the sound transducers, a magnitude of the terminating impedences being greater than an internal impedance of the signal generator; and
   a reception multiplexer configured to couple the receiver to at least one of the pair of sound transducers, the reception multiplexer comprising a portion of the plural switching transistors whose control input is supplied by current sources.

2. The circuit arrangement according to claim 1, further comprising
   an evaluation circuit coupled to the receiver, the evaluation circuit configured to control at least one of the signal generator, the reception multiplexer, and the switching operations of at least one of the plural switching elements.

3. The circuit arrangement according to claim 1, wherein the signal generator comprises a current mirror connected to at least one of the pair of sound transducers.

4. The circuit arrangement according to claim 3, wherein a current source comprises a portion of the current mirror, the current source being at ground potential controlled by a controllable current source.

5. The circuit arrangement according to claims 1, wherein the at least one of the plural switch elements is a cascode circuit configured to couple the signal generator to at least one of the pair of sound transducers.

6. The circuit arrangement according to one of claims 1, wherein the circuit arrangement is configured to operate a flow sensor to determine a gas mass flow of an internal combustion engine.

* * * * *